United States Patent
Tsukada et al.

(10) Patent No.: US 8,886,843 B2
(45) Date of Patent: Nov. 11, 2014

(54) STORAGE APPARATUS AND METHOD OF CONTROLLING THE SAME

(71) Applicant: Hitachi, Ltd., Tokyo (JP)

(72) Inventors: Masaru Tsukada, Odawara (JP); Shinichi Hiramatsu, Odawara (JP); Yuya Goto, Odawara (JP); Jun Miyashita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 13/640,438

(22) PCT Filed: Sep. 25, 2012

(86) PCT No.: PCT/JP2012/006097
§ 371 (c)(1),
(2), (4) Date: Nov. 21, 2012

(87) PCT Pub. No.: WO2014/049635
PCT Pub. Date: Apr. 3, 2014

(65) Prior Publication Data
US 2014/0089540 A1    Mar. 27, 2014

(51) Int. Cl.
*G06F 3/00* (2006.01)
*G06F 9/46* (2006.01)
*G06F 3/06* (2006.01)

(52) U.S. Cl.
CPC ............ *G06F 3/0601* (2013.01); *G06F 3/0659* (2013.01); *G06F 3/061* (2013.01); *G06F 3/0658* (2013.01); *G06F 3/0689* (2013.01)
USPC .............................................. 710/5; 718/102

(58) Field of Classification Search
CPC ... G06F 3/0601; G06F 3/0658; G06F 3/0659; G06F 3/0689; G06F 3/061
See application file for complete search history.

(56) References Cited

U.S. PATENT DOCUMENTS

| 5,606,679 A * | 2/1997 | Cohn et al. ................. 711/4 |
| 8,612,711 B1 * | 12/2013 | Griffin ................... 711/165 |
| 2007/0220514 A1 * | 9/2007 | Sugimoto et al. ............ 718/100 |

* cited by examiner

*Primary Examiner* — Ernest Unelus
*Assistant Examiner* — Ronald Modo
(74) *Attorney, Agent, or Firm* — Volpe and Koenig, P.C.

(57) ABSTRACT

A storage apparatus 10 includes a communication control processor 11 that is a processor configured to control communications with a host apparatus 3, and plurality of main processors 12 each configured to perform an I/O process on a storage drive 171 according to an I/O request received from the host apparatus 3. The storage apparatus 10 manages data to be stored or that has been stored in the storage drive 171 in accordance with the CKD format. The storage apparatus 10 distributes the I/O process to the plurality of main processors 12 in units of the data fields on basis of the operation rates of the respective main processors 12, information on a C field, a K field, and a D field that are data fields forming a record of data targeted by the I/O process and managed in CKD format, and an I/O load indicator being a load indicator of the I/O process currently running on each of the main processors.

12 Claims, 16 Drawing Sheets

BASIC OPERATION OF STORAGE APPARATUS

CKD FORMAT

Fig. 13

OPERATION INFORMATION 1300

| MAIN PROCESSOR ID | ITEM | VALUE |
|---|---|---|
| 0 | OPERATION RATE (%) | 5 |
|   | I/O ACTIVE COUNT | 2 |
| 1 | OPERATION RATE (%) | 1 |
|   | I/O ACTIVE COUNT | 0 |
| 2 | OPERATION RATE (%) | 8 |
|   | I/O ACTIVE COUNT | 3 |
| 3 | OPERATION RATE (%) | 8 |
|   | I/O ACTIVE COUNT | 1 |
| . | . |   |
| . | . |   |
| n |   |   |

Fig. 17

DISTRIBUTION INFORMATION 1700

| | | |
|---|---|---|
| 1711 | READ PORTION | RECORD |
| 1712 | READ NUMBER | 2 |
| 1713 | CCW NUMBER | x0300 |
| 1714 | SEQUENCE NUMBER | 1 |
| 1715 | STORAGE DESTINATION ADDRESS | x48000000 |
| 1716 | C FIELD INFORMATION | |
| | 1 | CCHHR | x0123000701 |
| | | KL | x00 |
| | | DL | x1000 |
| | 2 | CCHHR | x0123000702 |
| | | KL | x00 |
| | | DL | x1000 |

STORAGE APPARATUS AND METHOD OF CONTROLLING THE SAME

TECHNICAL FIELD

The present invention relates to a storage apparatus and a method of controlling a storage apparatus.

BACKGROUND ART

PTL 1 discloses a storage system including a plurality of microprocessors and configured to prevent load concentration on one microprocessor in the following manner. Specifically, when one of the plurality of microprocessors performing an I/O process for a received I/O request has a load heavier than a first load, the microprocessor allocates at least an I/O process part of the I/O process to any of the other microprocessors and the other microprocessor performs at least the I/O process part (the I/O process part is a process part including a cache control process involving reserving one area of a cache memory 20, i.e., a cache area for storing data in the cache memory 20).

CITATION LIST

Patent Literature

PTL 1: Japanese Patent Application Laid-open Publication No. 2007-249729

SUMMARY OF INVENTION

Technical Problem

Nowadays, more and more storage apparatuses are equipped with multi-core processors in order to enhance processing performance and response performance. A storage apparatus equipped with a multi-core processor is capable of performing parallel processing among core processors and is expected to achieve performance improvement of the whole storage apparatus.

Even being equipped with a multi-core processor, however, the storage apparatus cannot always receive the benefit of the multi-core processor to a process not subjected to the parallel processing. For example, when the storage apparatus receives a read request from a mainframe, only one core processor performs a data transfer process for the read request. In this case, effects on performance improvement can be expected if the apparatus operating under a heavy load as a whole has multiple core processors operating in parallel. However, if the apparatus only operates under a low load with some core processors not running any processes, the load is concentrated on the core processor in charge of the process, and the effects produced by the multi-core processor cannot be expected.

Meanwhile, mainframes widely employ, as a data management method, a so-called CKD (Count Key Data) format in which one track consists of a predetermined number of records each including three data fields of a C field, a K field, and a D field. Currently, however, no effective load balancing among core processors is made for data management using this CKD format.

The present invention has been made in view of such circumstances, and has an objective to provide a storage apparatus and a method of controlling a storage apparatus, which are capable of improving performance of the storage apparatus.

Solution to Problem

One aspect of the present invention to achieve the foregoing objective is a storage apparatus including a communication control processor that is a processor configured to control communications with an external apparatus, and a plurality of main processors each configured to perform an I/O process on a storage drive according to an I/O request received from the external apparatus, wherein the storage apparatus manages data to be stored or data that has been stored in the storage drive in accordance with CKD format, and distributes the I/O process to a plurality of the main processors in units of data fields on basis of operation rates of the respective main processors and information on a C field, a K field, and a D field that are data fields forming a record of data targeted by the I/O process and managed in CKD format.

Other problems and solutions thereto disclosed by the present application will be clarified in the description of embodiments, drawings, and the like.

Advantageous Effects of Invention

According to the present invention, the performance of a storage apparatus can be improved.

BRIEF DESCRIPTION OF DRAWINGS

FIG. 13 is a diagram illustrating an example of operation information 1300.
FIG. 17 is a diagram illustrating an example of allocation information 1700.

DESCRIPTION OF EMBODIMENTS

Figure 1:
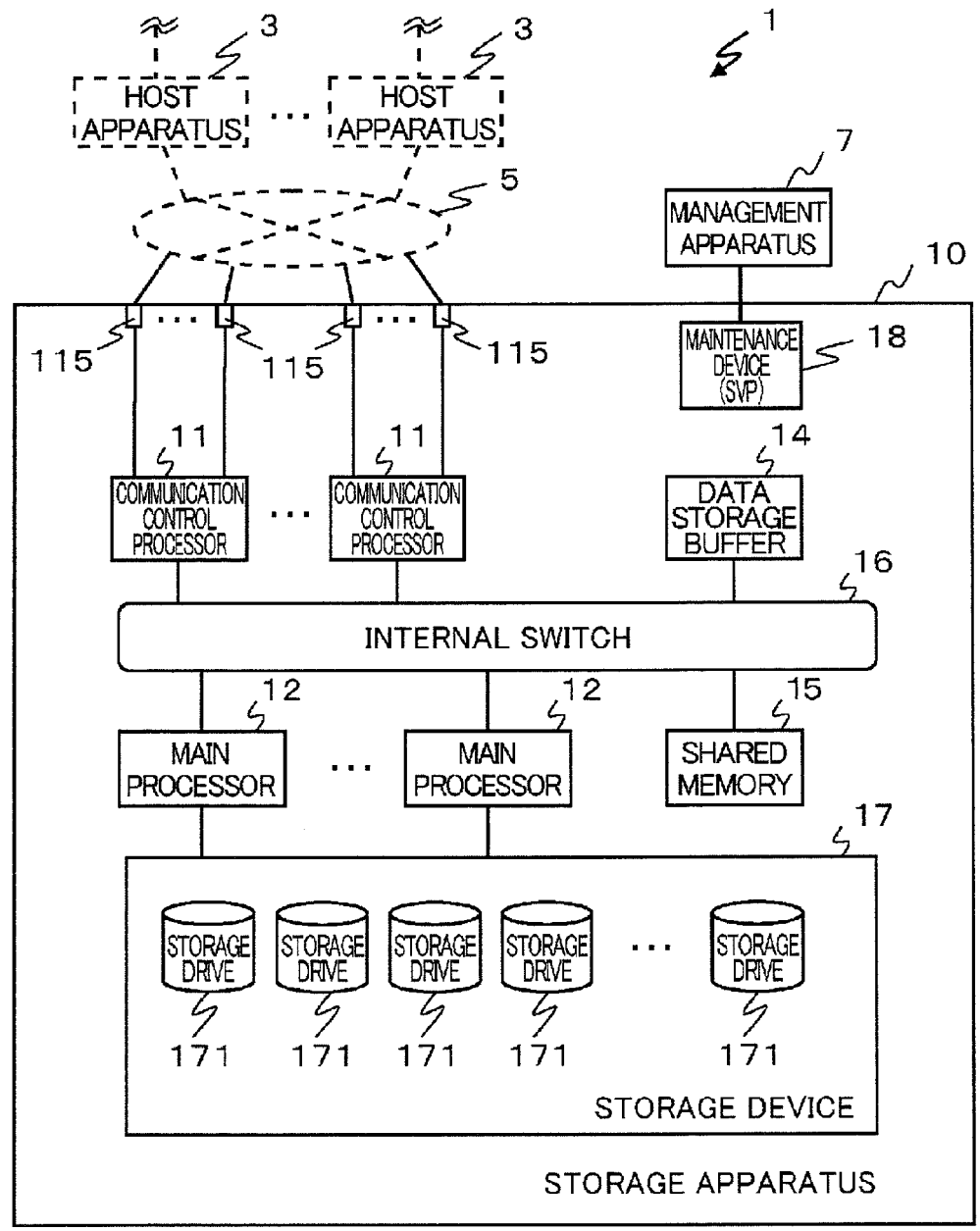
FIG. 1 is a diagram illustrating a configuration of an information processing system 1.

FIG. 1 illustrates an information processing system 1 described as an embodiment. As illustrated in FIG. 1, the information processing system 1 includes one or more host apparatuses 3 (external apparatuses) and one or more storage apparatuses 10.

The host apparatuses 3 are information processing apparatuses (computers) that provide services such as an automated teller service in a bank and a web page browsing service on the Internet. The host apparatuses 3 in the present embodiment are mainframes (general-purpose computers).

The host apparatuses 3 and the storage apparatuses 10 are communicatively coupled to each other through a communication network 5. The communication network 5 is, for example, a LAN (Local Area Network), a WAN (Wide Area Network), a SAN (Storage Area Network), the Internet, a public communication network, a dedicated line, or the like.

Communications through the communication network 5 are performed in accordance with protocols such for example as TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), and FIBARC (Fibre Connection Architecture) (registered trademark).

The host apparatuses 3 each include a CPU 31(Central Processing Unit), a memory 32 (RAM (Random Access Memory), ROM (Read Only Memory), or NVRAM (Non Volatile Random Access Memory)), a storage device 33 (for example, a hard disk drive, or a semiconductor storage device (SSD (Solid State Drive))), an input device 34 such as a keyboard and a mouse, an output device 35 such as a liquid crystal monitor or a printer, and a network interface (hereinafter, referred to as a network I/F 36) such as NIC (Network Interface Card) or HBA (Host Bus Adapter).

When accessing a storage area provided by any of the storage apparatuses 10, the host apparatus 3 sends the storage apparatus 10 a data frame (hereinafter, simply referred to as a frame) including an I/O request (such as a write request or a read request). This frame is, for example, a Fibre Channel (FC) frame (FC frame).

Each of the storage apparatuses 10 is an apparatus configured to provide data storage areas to the host apparatuses 3, and is a disk array apparatus, for example. As illustrated in FIG. 1, the storage apparatus 10 includes one or more communication control processors 11, one or more main processors 12, a data storage buffer 14, a shared memory 15, an internal switch 16, a storage device 17, and a maintenance device 18.

The communication control processors 11, the main processors 12, the data storage buffer 14, and the shared memory 15 are communicatively coupled to each other through the internal switch 16. In addition, the maintenance device 18 is communicatively coupled to the communication control processors 11, the main processors 12, the data storage buffer 14, the shared memory 15, and the internal switch 16 through appropriate communication means (for example, LAN, USB (Universal Serial Bus), RS-232C or the like).

Figure 2:
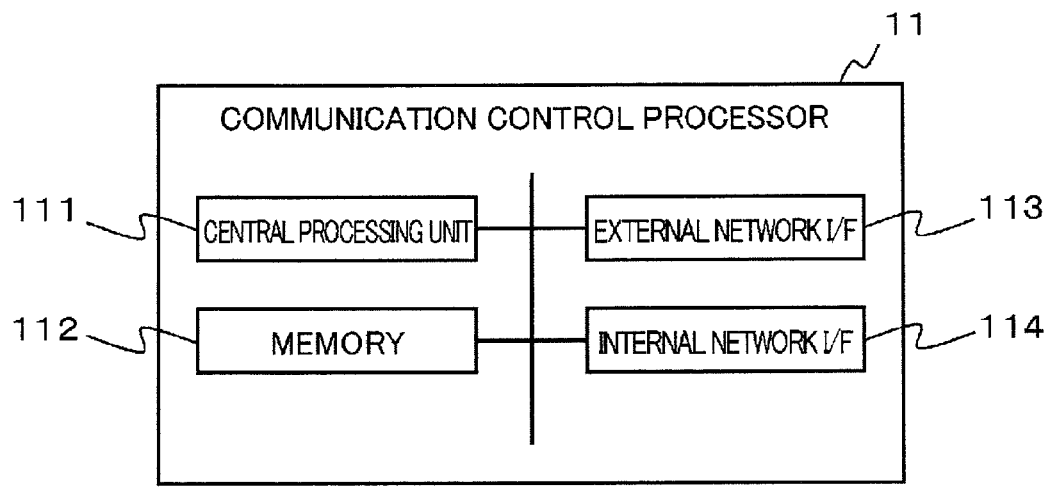
FIG. 2 is a diagram illustrating hardware of a communication control processor 11.

FIG. 2 illustrates hardware of each of the communication control processors 11. As illustrated in FIG. 2, the communication control processor 11 includes a central processing unit 111, a memory 112, an external network interface (such as NIC or HBA)(hereinafter referred to as an external network I/F 113), and an internal network interface (hereinafter referred to as an internal network I/F 114).

The central processing unit 111 is a processor including a CPU, MPU, ASIC (Application Specific Integrated Circuit) or the like. The memory 112 includes a ROM or a RAM (that may be a NVRAM).

The external network I/F 113 is, for example, NIC, HBA or the like. The external network I/F 113 includes one or more network ports 115. Each of the network ports 115 is given an identifier (port ID) (for example, WWN (World Wide Name)).

The internal network I/F 114 communicates with the other components included in the storage apparatus 10 through the internal switch 16 in accordance with a certain communication standard (for example, PCI bus (PCI: Peripheral Component Interconnect)).

The communication control processor 11 receives I/O requests sent from the host apparatuses 3. For each I/O request received from any of the host apparatuses 3, the communication control processor 11 performs such as analyzing the protocol level, distributing the process to one of the main processors 12, storing write data accompanying a write request into the data storage buffer 14, sending read data to the host apparatus 3, and sending a response to the host apparatus 3.

In accordance with the content of the I/O request sent from the communication control processor 11, the main processor 12 performs an I/O process on a storage drive 171 to be described later (writes write data to the storage drive 171 or reads read data from the storage drive 171).

Figure 3:
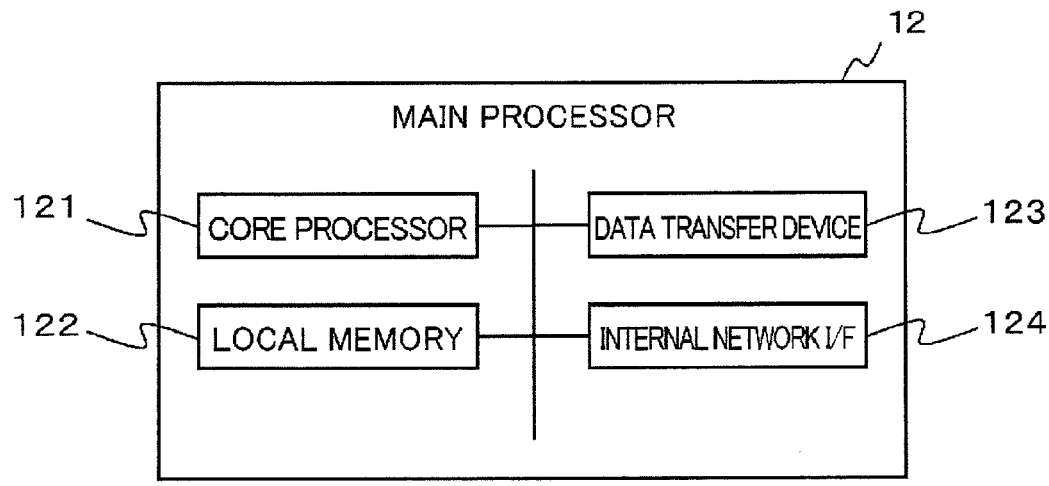
FIG. 3 is a diagram illustrating hardware of a main processor 12.

FIG. 3 illustrates hardware of the main processor 12. As illustrated in FIG. 3, the main processor 12 includes a core processor 121, a local memory 122, a data transfer device 123, and an internal network interface (hereinafter referred to as internal network I/F 124).

The core processor 121 is one of the core processors included in a multi-core type processor (hereinafter referred to as a multi-core processor) mounted in the storage apparatus 10. The local memory 122 includes a ROM and a RAM (that may also be a NVRAM).

The data transfer device 123 includes a high-speed data transfer chip such as a DMA (Direct Memory Access). The data transfer device 123 is incorporated in the core processor 121 in some cases.

The internal network I/F 124 communicates with the other components included in the storage apparatus 10 through the internal switch 16 in accordance with a certain communication standard (for example, PCI bus, PCI-X bus, or the like).

In response to the I/O request received by the communication control processor 11, the main processor 12 performs data transfer between the communication control processor 11 and the data storage buffer 14, and performs data transfer between the data storage buffer 14 and the storage device 17. The latter data transfer includes, for example, transfer of data stored in the storage device 17 to the data storage buffer 14 (staging) and transfer of data stored in the data storage buffer 14 to the storage device 17 (destaging).

The data storage buffer 14 illustrated in FIG. 1 is configured by using, for example, a RAM to which fast access is possible. The data storage buffer 14 stores therein write data received from the host apparatus 3 and read data loaded from the storage device 17.

The shared memory 15 stores therein various kinds of information to be used to control the storage apparatus 10 (for example, configuration information and operation information of the storage apparatus 10 (an operation rate (%) of each main processor 12 (an operation rate in a given period of time in the past), and the number of I/O requests currently running on each main processor 12 (the total number of I/O requests currently running on the main processor 12 and I/O requests registered in a process queue of the main processor 12, which is hereinafter referred to as an I/O active count). Here, a user is allowed to access all or part of the information stored in the shared memory 15 through the maintenance device 18 from a management apparatus 7.

The internal switch 16 illustrated in FIG. 1 is, for example, a high-speed cross bar switch.

The storage device 17 illustrated in FIG. 1 includes a plurality of storage drives 171 that are physical storage media. The storage drives 171 are, for example, hard disk drives and semiconductor storage devices (SSD) in the formats of SAS (Serial Attached SCSI), SATA (Serial ATA), FC (Fibre Channel), PATA (Parallel ATA), SCSI, and the like. The storage devices 17 are housed in the same chassis as the storage apparatus 10 in some cases, or are housed in a chassis different from the chassis of the storage apparatus 10 in other cases.

Here, a cache memory for improving the performance of response to the host apparatuses 3, for example, may be provided between the data storage buffer 14 and the storage device 17. Instead, the data storage buffer 14 itself may be configured to function as a cache memory.

The storage apparatus 10 provides the storage areas of the storage drives 171 to the host apparatuses 3 in units of logical units (LU) each configured by allocating a given unit of storage area (hereinafter referred to as a physical page) of one of the storage drives 171, for example.

Each of the logical units is associated with a device file or a drive letter (drive name) in the host apparatus 3, for example. In addition, each of the logical units is given a logical unit number (LUN) that is an identifier unique to the logical unit. In this case, the host apparatus 3 specifies the logical unit by using the LUN. This LUN is set in the foregoing I/O request, for example.

Moreover, the storage apparatus 10 recognizes a physical storage area provided by the storage drive 171 (hereinafter referred to as a physical storage area) in units of logical devices (LDEV) that are storage areas logically set up by using the physical storage area. In this case, each of the logical devices is given a logical device number (LDEV number), as an identifier, which is unique to the logical device.

The storage areas of the logical devices are configured, for example, as storage areas of a RAID group that is formed by controlling a plurality of hardware devices in accordance with a RAID (Redundant Arrays of Inexpensive (or Independent) Disks) scheme (at least any one of RAIDs 0 to 6).

The maintenance device 18 (SVP: Service Processor) is configured by using a personal computer, for example. The maintenance device 18 performs such as status monitoring, configuration setting, collection of operation information, and storage of operation information into the shared memory 15 for the components of the storage apparatus 10 (including at least the communication control processors 11, the main processors 12, the data storage buffer 14, the shared memory 15, and the internal switch 16). In addition, through communications with the management apparatus 7, the maintenance device 18 provides information to the management apparatus 7, controls the storage apparatuses 10 according to instructions from the management apparatus 7, or the like.

The management apparatus 7 is configured by using a personal computer, for example. The management apparatus 7 is communicatively coupled to the maintenance device 18 through a LAN or the like. The management apparatus 7 provides a user interface (GUI (Graphical User Interface) or CLI (Command Line Interface)) with which a user gives a job execution command to the storage apparatus 10, makes a configuration setting of the storage apparatus 10, makes an operation setting of the storage apparatus 10, or does the like.

<CCW>

An I/O request sent from the host apparatus 3 to the storage apparatus 10 includes a single command code chain that is a chain of command codes (hereinafter referred to as CCWs (Channel Command Word)) (the command code chain is hereinafter referred to as a CCW chain).

There are CCWs such as one including a write command forming a write request, one including a read command forming a read request, one including a control command such as a seek command to move the arm of a disk or a search command, and one including a sensing command that requests information on a component in the storage apparatus 10.

Figure 4:
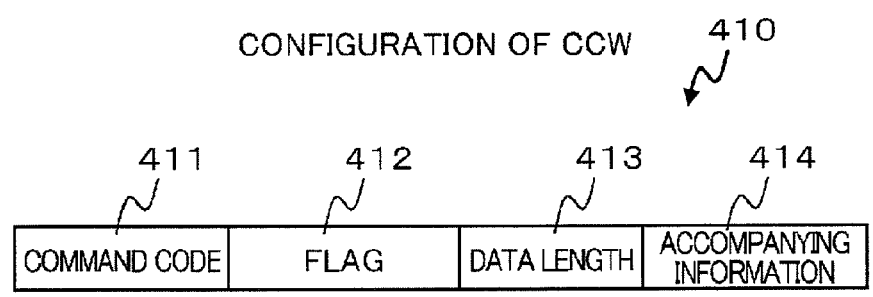
FIG. 4 is a diagram illustrating a configuration of a CCW 410.

FIG. 4 illustrates a configuration of a CCW. As illustrated in FIG. 4, a CCW 410 includes information pieces of a command code 411, a flag 412, a data length 413, and accompanying information 414 (parameters and data) of the command code.

Among them, the command code 411 has set therein a command (a write command, a read command, a seek command, a search command, or the like).

The flag 412 has set therein supplemental information of the command set in the command code 411 or the like.

The data length 413 has set therein the data length of the data (read data, write data or the like) to be processed for the parameter of the command or the command set in the command code 411.

The accompanying information 414 of the command code has set therein information (e.g. seek address, search address, write data and the like) required for the command code 411.

<Basic Operation>

When receiving a CCW chain from any of the host apparatuses 3, the communication control processor 11 in the storage apparatus 10 analyzes the protocol and thereafter sends the main processor 12 the CCWs 410 included in the CCW chain. Here, for example, when a CCW 410 thus sent includes a write command or a control command, the CCW 410 is accompanied by write data or the like. In this case, the communication control processor 11 stores the data accompanying the CCW into the data storage buffer 14, and informs the main processor 12 of the address of the storage location together with the CCW 410.

The main processor 12 performs processing according to the CCW 410 sent from the communication control processor 11.

In the case of a CCW 410 including a write command, for example, the main processor 12 writes the write data stored in the data storage buffer 14 to the storage device 17.

In the case of a CCW 410 including a read command, for example, the main processor 12 reads the read data from the storage device 17 and stores the data into the data storage buffer 14. Thereafter, the read data stored in the data storage buffer 14 is sent to the host apparatus 3 by the communication control processor 11.

Figure 5:
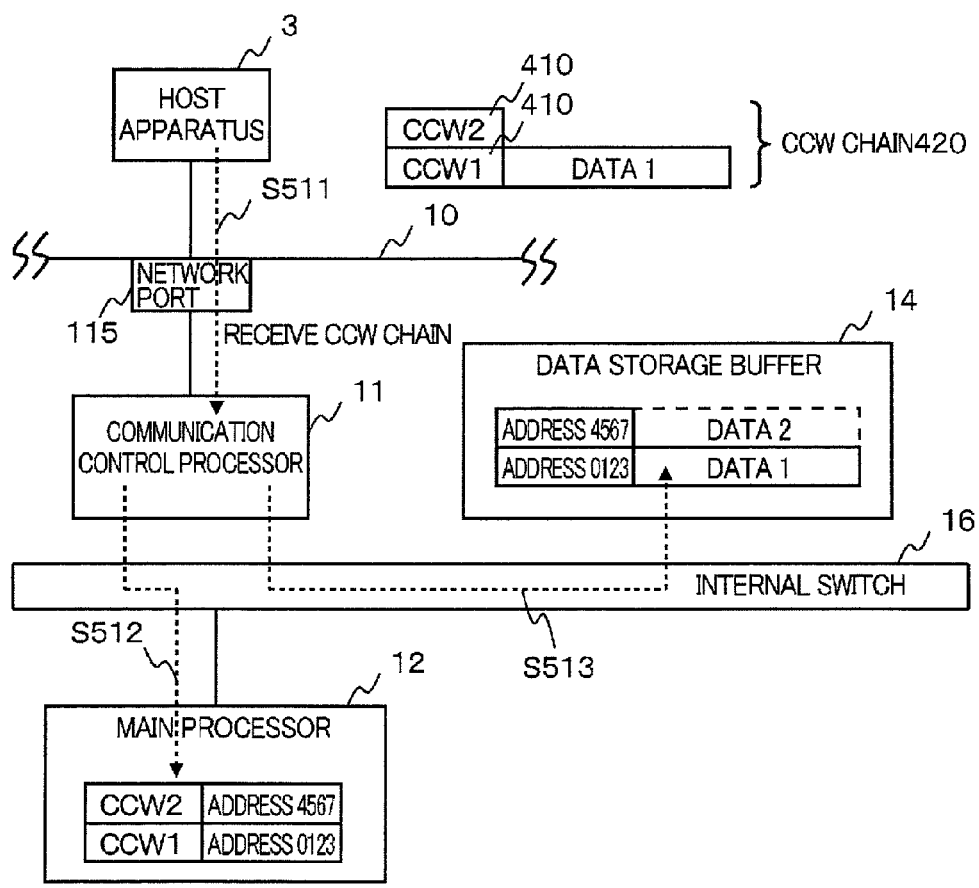
FIG. 5 is a diagram for explaining a basic operation of a storage apparatus 10 for a CCW chain 420.
Figure 6:
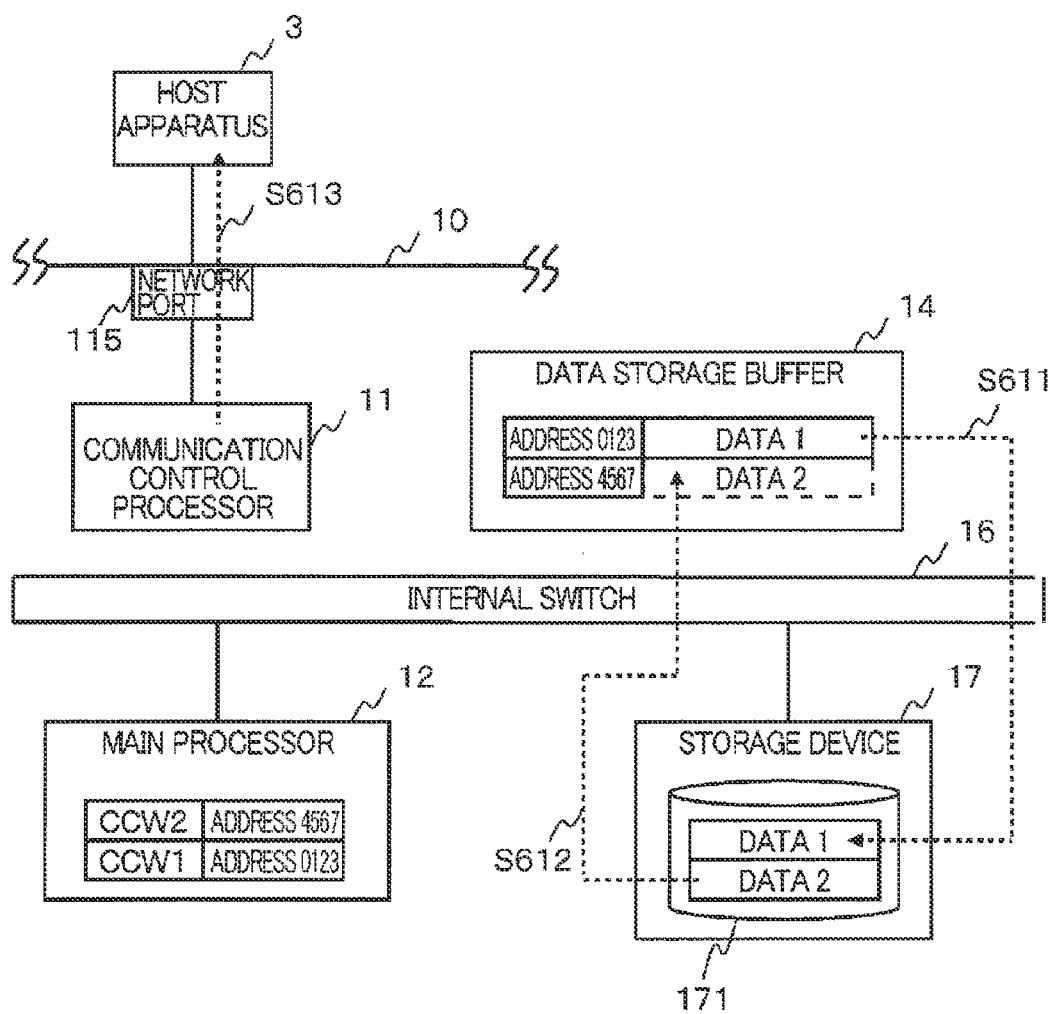
FIG. 6 is a diagram for explaining the basic operation of the storage apparatus 10 for the CCW chain 420.

FIGS. 5 and 6 illustrate a basic operation of the storage apparatus 10 for a CCW chain 420 received from the host apparatus 3. FIGS. 5 and 6 illustrate the basic operation that the storage apparatus 10 performs when receiving a CCW chain 420 including two CCWs 410 of "CCW1" and "CCW2" from the host apparatus 3.

Here, the following description is provided on the assumption that a "write command" to write "data1" of write data is set in the command code 411 of the "CCW 1" and that a "read command" instructing to read "data2" of read data is set in the command code 411 of the "CCW2."

As illustrated in FIG. 5, when receiving the CCW chain 420 (S511), the communication control processor 11 sends information on the CCW chain 420 to the main processor 12.

Since the write command is set in the "CCW1," for example, the communication control processor 11 sends the content of the "CCW1" to the main processor 12 (S512), and stores the write data "data 1" accompanying the "CCW1" into the data storage buffer 14 (S513).

In addition, since the read command is set in the "CCW2," for example, the communication control processor 11 sends the content of the "CCW2" to the main processor 12 (S512).

Subsequently, as illustrated in FIG. 6, the main processor 12 stores the write data "data 1" stored in the data storage buffer 14 into the storage drive 171 according to the content of the "CCW1" (S611).

Then, the main processor 12 reads the read data "data2" from the storage drive 171 and stores (transfers) the read data into the data storage buffer 14 according to the content of the "CCW2" (S612).

After that, the communication control processor 11 sends the host apparatus 3 the read data stored in the data storage buffer 14 and a completion notification of the I/O request (S613).

<CKD Format>

The storage apparatus 10 of the present embodiment manages data sent from the mainframe host apparatuses 3 in accordance with the CKD format (CKD: Count Key Data format).

Figure 7:
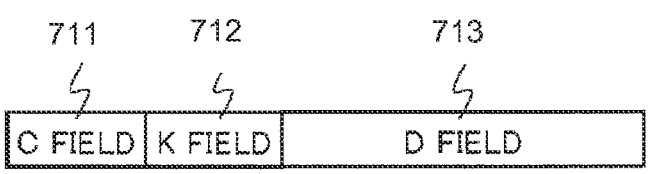
FIG. 7 is a diagram illustrating a configuration of a CKD format.

FIG. 7 illustrates a configuration of the CKD format. As illustrated in FIG. 7, the CKD format includes three information fields of a C field 711 (Count field), a K field 712 (Key field), and a D field 713 (Data field) (hereinafter these fields are also collectively referred to as data fields).

Among them, the C field 711 stores therein the location of the data (a cylinder number, head number, record number (CCHHR)), a data length of the K field 712, a data length of the D field 713 and the like.

The K field 712 stores therein information related to an application that runs in the host apparatus 3 (e.g., information on a search key), for example.

The D field 713 stores therein the entity of the write data or read data.

Here, the C field 711 is data in a fixed-length format (for example 8 Bytes), whereas both the K field 712 and the D field 713 are data in a variable-length format.

Figure 8:
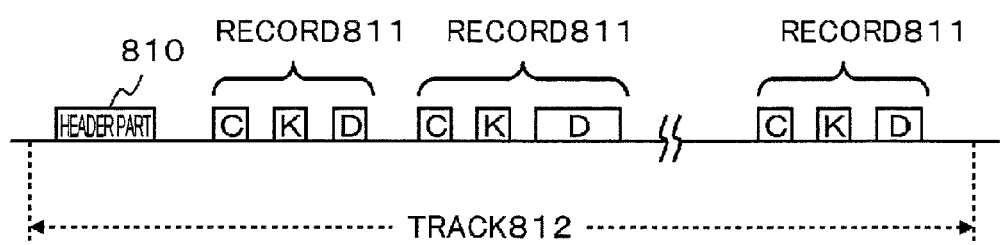
FIG. 8 is a diagram for explaining data management units (record and track) in the CKD format.

As illustrated in FIG. 8, the data in CKD format is managed in units of records and tracks.

Specifically, a piece of data in CKD format (data including a combination of one C field 711, one K field 712, and one D field 713 (the K field 712 and the D field 713, however, are not included in the CKD format in some cases)) is managed as one record 811. A set of a predetermined number of records 811 is managed as one track 812 including a header part 810. The predetermined number is set to an appropriate value depending on the configuration of the storage apparatus 10 or the type of the storage drives 171.

<Master-Slave Relationship Between Main Processors>

In the storage apparatus 10 of the present embodiment, the main processors 12 are classified into master processors and slave processors according to their respective roles.

When receiving the CCWs 410 sent from the communication control processor 11, the master processor sends a plurality of commands (hereinafter referred to as sub-commands) generated according to the contents of the CCWs 410 to a plurality of slave processors.

The slave processor performs processing according to the sub-command sent from the master processor, and returns a response or a processing result thereof to the master processor or the communication control processor 11.

Here, information indicating which of the master processor and the slave processor each of the main processors 12 currently serves as is stored and managed in, for example, the shared memory 15, the memory 112 of the communication control processor 11, in the local memory 122 of the main processor 12, or the like. By use of this information, the communication control processor 11 and the main processor 12 can know which of the master processor and the slave processor each of the main processors 12 serves as.

Which of the main processors 12 serves as the master processor and which of the main processors 12 serves as the slave processor are determined by the communication control processor 11, the main processor 12, the maintenance device 18 (the management apparatus 7), or the like, statically (e.g., depending on the attribute or type of the storage drive 171 for which the main processor 12 is responsible) or dynamically (e.g., in view of load balancing based on the operation state of the storage apparatus 10).

<Read Sequence>

Figure 9:
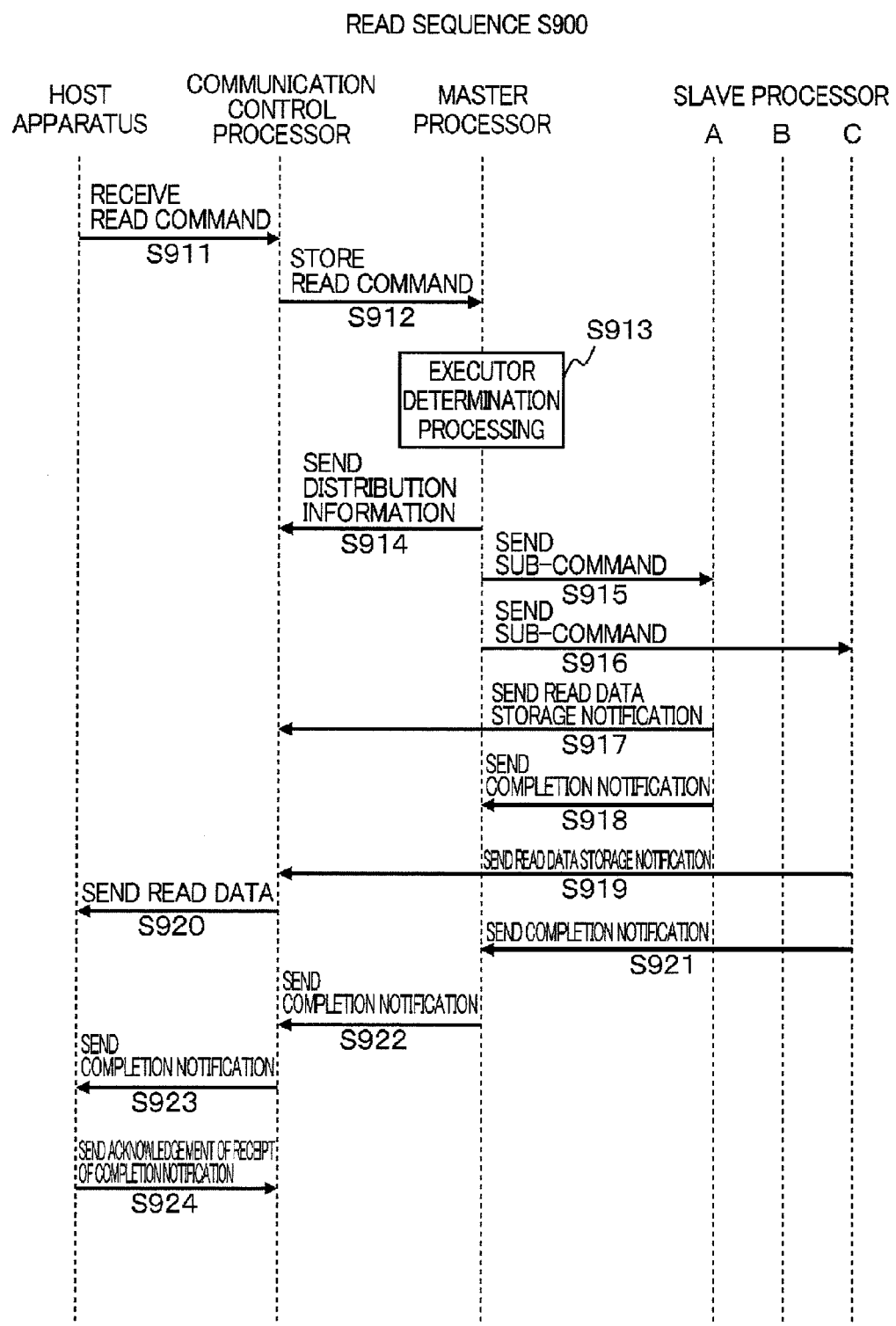
FIG. 9 is a diagram for explaining a read sequence S900.

FIG. 9 illustrates a sequence performed in the information processing system 1 when the storage apparatus 10 receives a CCW 410 including a read command (hereinafter referred to as a read sequence S900). The read sequence S900 will be described below with reference to FIG. 9.

When receiving the CCW 410 including the read command from the host apparatus 3 (S911), the communication control processor 11 stores the content of the CCW 410 into the local memory 122 of the master processor (S912).

The master processor performs processing of determining a main processor 12 in charge of the process for the CCW 410 stored in the local memory 122 (hereinafter referred to as executor determination processing S913). The executor determination processing S913 will be described in details later.

Upon completion of the executor determination processing S913, the master processor generates information on the process distribution for the read command (hereinafter referred to as distribution information (FIG. 17)) on the basis of a return value of the executor determination processing S913, and sends the distribution information to the communication control processor 11 (S914). The distribution information will be described in details later.

Moreover, when the return value of the executor determination processing S913 indicates that a slave processor takes charge of the process for the read command, the master processor sends a sub-command to the slave processor in charge of the process, the sub-command instructing the slave processor to execute the assigned process (S915, S916). Here, FIG. 9 illustrates a case where the return value of the executor determination processing S913 indicates that a "slave processor A" and a "slave processor C" take charge of the process.

In response to the sub-command sent from the master processor, each of the slave processors reads read data, which is to be transferred by the slave processor itself, from the storage drive 171 and stores the read data into the data storage buffer 14. In addition, the slave processor sends the communication control processor 11 a notification indicating that the read data is stored in the data storage buffer 14 (hereinafter referred to as a read data storage notification) (S917, S919).

Figure 18:
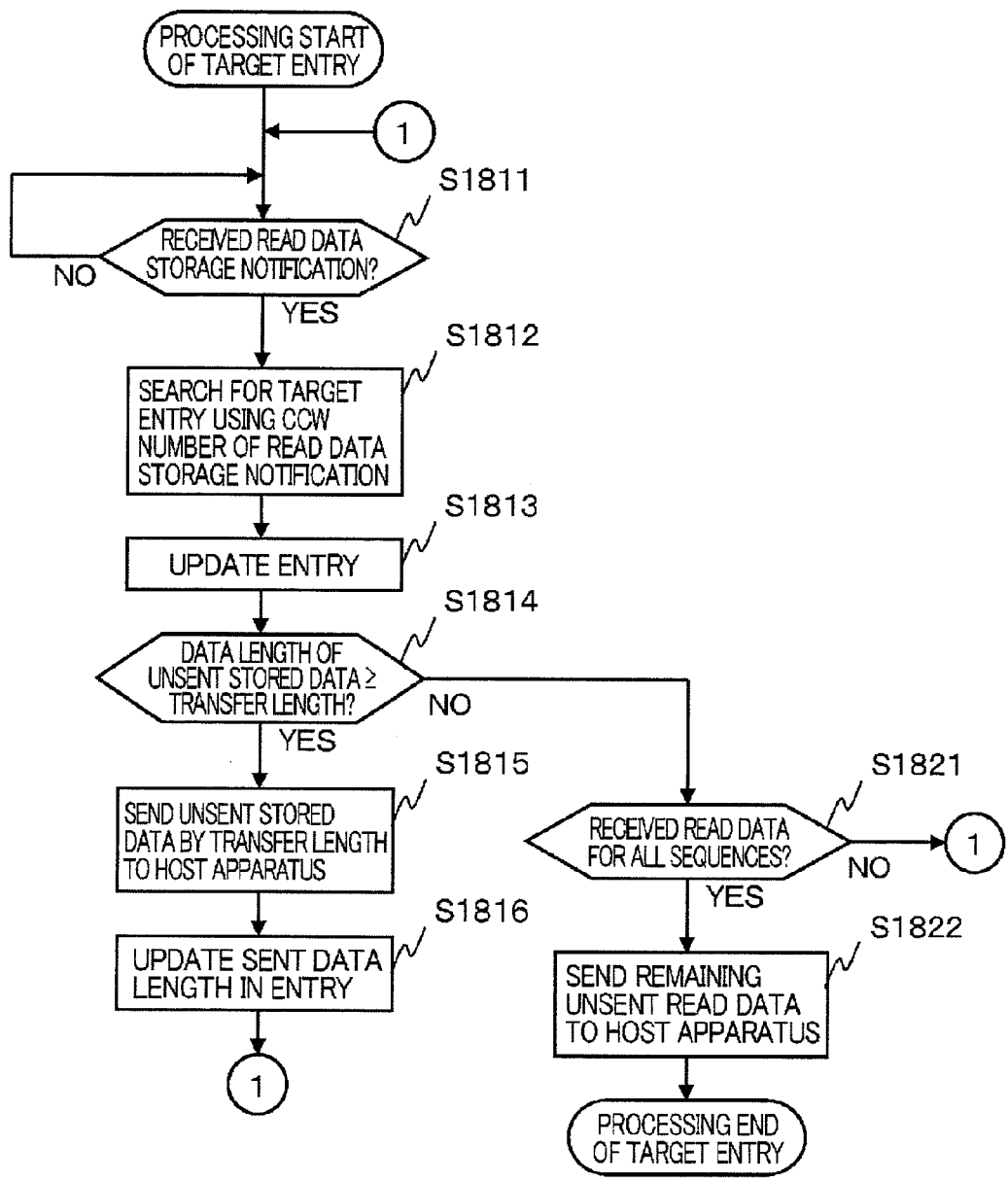
FIG. 18 is a flowchart for explaining read data transfer processing S1800.

Meanwhile, on the basis of the distribution information received in S914, the communication control processor 11 monitors in real time a storage state into the data storage buffer 14 for the read data to be returned as a response to the read command to the host apparatus 3. Then, when confirming that read data in a transfer unit to the host apparatus 3 is present in the data storage buffer 14, the communication control processor 11 sends the host apparatus 3 the read data in the transfer unit stored in the data storage buffer 14 (S920). The processing of the communication control processor 11 in this operation will be described in detail later (FIG. 18).

Since the slave processor sends the read data storage notification directly to the communication control processor 11 not via the master processor, the communication control processor 11 provides the read data to the host apparatus 3 quickly.

Returning FIG. 9, the slave processor sends the master processor a notification indicating the completion of the process for the sub-command (S918, S921).

When the notifications indicating the completion of the processes for the sub-commands are received from all the slave processors assigned the process for the read command (S918, S921), the master processor notifies the communication control processor 11 of the completion of the process for the read command (S922).

The communication control processor 11 sends the host apparatus 3 notification indicating the completion of the process for the read command (S923). In addition, the communication control processor 11 receives an acknowledgement of the receipt of the notification from the host apparatus 3 (S924).

Although the foregoing read sequence S900 is in the case where only two slave processors (the slave processor A and the slave processor C) take charge of the process for the read command, the master processor may take charge of part of the process for the read command together with the slave processors, instead. In this case, when storing read data to be processed by the master processor itself, the master processor sends the communication control processor 11 of the storage notification thereof (the read data storage notification). Then, the communication control processor 11 transfers the read data to the host apparatus 3 on the basis of the read data storage notifications sent from the slave processors and the read data storage notification sent from the master processor. In addition, when receiving the completion notifications from the respective slave processors (S918, S921) and completing the part of the process for the read command assigned to the master processor itself, the master processor sends the completion notification to the communication control processor 11 (S922).

<Write Sequence>

Figure 10:
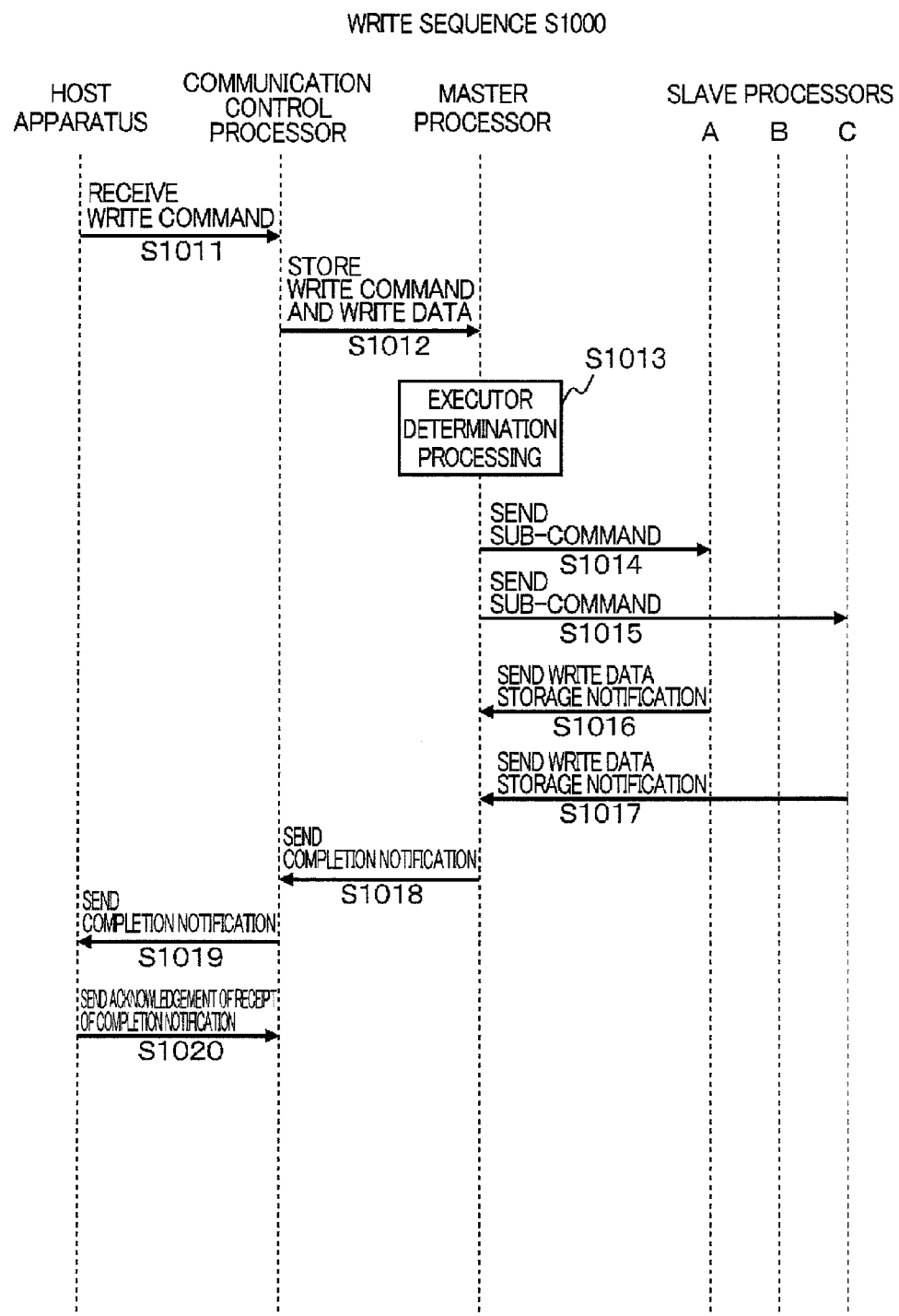
FIG. 10 is a diagram for explaining a write sequence S1000.

FIG. 10 illustrates a sequence performed in the information processing system 1 when the storage apparatus 10 receives a CCW 410 including a write command (hereinafter referred to as a write sequence S1000). The write sequence S1000 will be described below with reference to FIG. 10.

When receiving the CCW 410 including the write command from the host apparatus 3 (S1011), the communication control processor 11 stores the content of the CCW 410 into the local memory 122 of the master processor (S1012). Moreover, the communication control processor 11 stores the write data accompanying the CCW 410 into the data storage buffer 14 (S1012).

The master processor performs processing of determining a main processor 12 in charge of the process for the CCW 410 stored in the local memory 122 (hereinafter referred to as executor determination processing S1013). The executor determination processing S1013 will be described in detail later.

When a return value of the executor determination processing S1013 indicates that a slave processor takes charge of the process for the write command, the master processor sends a sub-command to the slave processor in charge of the process, the sub-command instructing the slave processor to execute the assigned processing (S1014, S1015). Here, FIG. 10 illustrates a case where the result of the executor determination processing S1013 indicates that only "slave processor A" and "slave processor C" take charge of the process.

In response to the sub-command sent from the master processor, each of the slave processors stores the write data, which is stored in the data storage buffer 14, into the storage drive 171 (S1014, S1015).

In addition, the slave processor sends the master processor a notification indicating that the write data is stored in the storage drive 171 (hereinafter referred to as a write data storage notification) (S1016, S1017).

When confirming that the write data storage notifications are received from all the slave processors taking charge of the process for the write command, the master processor sends a notification to that effect to the communication control processor 11 (S1018).

When receiving the notification, the communication control processor 11 sends a notification of the completion of the process for the write command to the host apparatus 3 (S1019), and receives an acknowledgement of the receipt of the notification from the host apparatus 3 (S1020).

Although the foregoing write sequence S1000 is in the case where only two slave processors (the slave processor A and the slave processor C) take charge of the process for the write command, the master processor may take charge of part of the process for the write command together with the slave processors, instead. In this case, the master processor stores the write data to be processed by the master processor itself into the storage drive 171. Then, when receiving the write data storage notifications from all the slave processors (S1016, S1017) and completing the part of the process for the write command which the master processor itself takes charge of, the master processor sends the completion notification to the communication control processor 11 (S1018).

<Executor Determination Processing>

Figure 11:
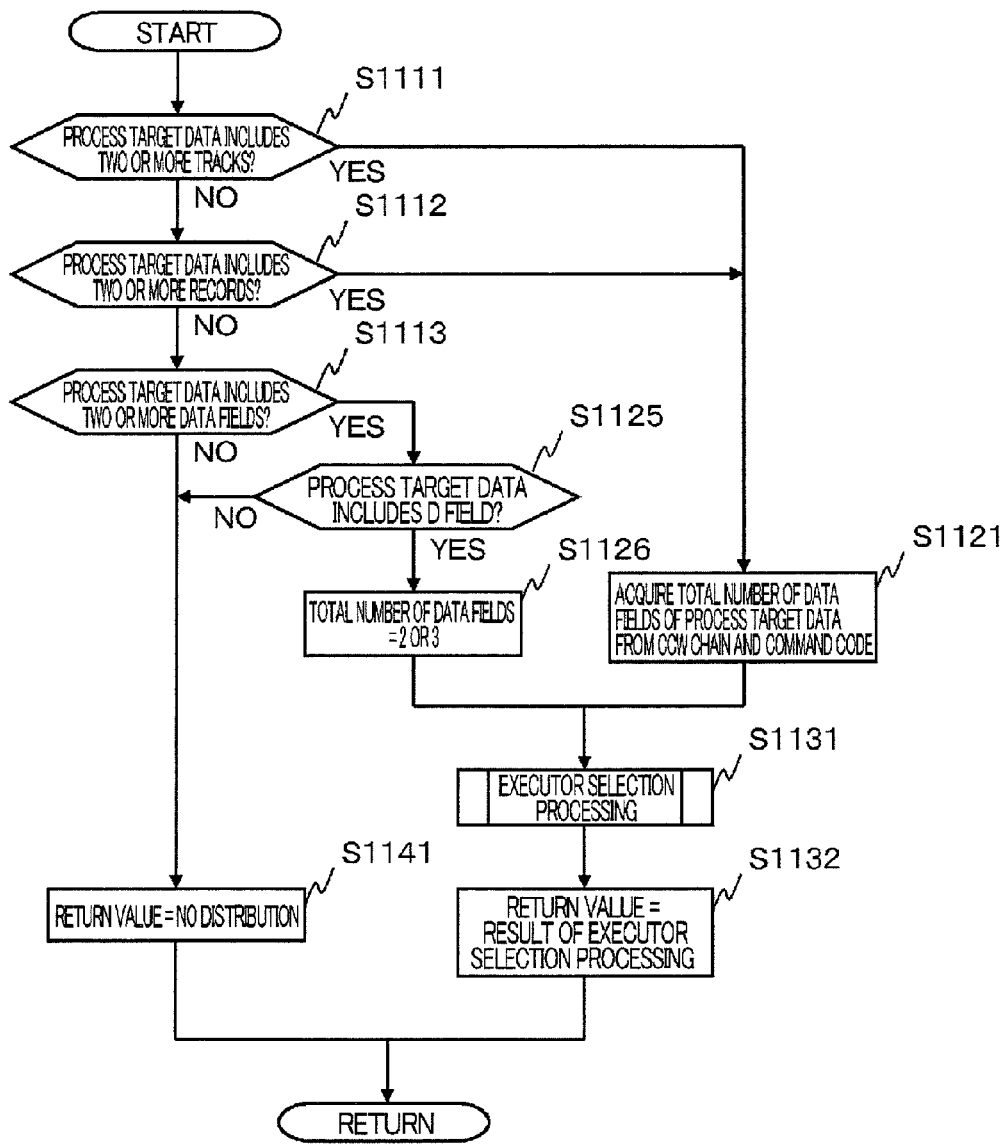
FIG. 11 is a flowchart for explaining executor determination processing S913.

FIG. 11 is a flowchart for explaining the executor determination processing S913 in the read sequence S900 in FIG. 9. It should be noted that the steps in the executor determination processing S1013 in the write sequence S1000 in FIG. 10 are the same as those in the executor determination processing S913. This processing is performed by the master processor as a main actor, and will be described below with reference to FIG. 11.

To begin with, the master processor judges whether process target data of a command (a read command in the case of the read sequence S900 or a write command in the case of the write sequence S1000; the same applies below) set in the command code 411 of the CCW 410 is data managed over a plurality of tracks (S1111). Note that the master processor makes this judgment based on the type of the command set in the command code 411 of the CCW 410, for example.

If the process target data of the command is managed over the a plurality of tracks (S1111: YES), the master processor acquires the total number of data fields of the process target data of the command (S1121). Specifically, the master processor acquires the total number of data fields by using, for example, information contained in the CCW 410 or the CCW chain 420 (the number of records of the process target data of the command, and the number of tracks of the process target data of the command). Thereafter, the processing advances to S1131.

If the process target data of the command is not managed over a plurality of tracks (in other words, the data includes a single track) (S1111: NO), then the master processor judges whether the process target data is managed over a plurality of records (S1112). Note that the master processor makes this judgment based on the type of the command set in the command code 411 of the CCW 410, for example.

If the process target data of the command is managed over the a plurality of records (S1112: YES), the master processor acquires the total number of data fields of the process target data of the command (S1121). Specifically, the master processor acquires the total number of data fields by using, for example, information contained in the CCW 410 or the CCW chain 420 (the number of records of the process target data of the command). Thereafter, the processing advances to S1131.

If the process target data of the command is not managed over the a plurality of records (in other words, the data includes a single record) (S1112: NO), then the master processor judges whether or not the process target data of the command includes a plurality of data fields (S1113). This judgment is made based on the CCW 410, for example.

If the process target data of the command includes multiple data fields (S1113: YES), then the master processor judges whether or not the process target data of the command contains the D field 713 (S1125). If the process target data of the command contains the D field 713 (S1125: YES), the master processor acquires the total number (=2 or 3) of data fields of the process target data of the command from the CCW 410 (S1126). Thereafter, the processing advances to S1131.

On the other hand, if the process target data of the command is judged as containing only a single data field in S1113 (S1113:NO), the master processor sets the return value of the executor determination processing S913 to "no distribution" (S1141). Then, the executor determination processing S913 is terminated.

Here, in the case where the return value is "no distribution," the master processor takes charge of the process for the command sent from the host apparatus 3, in principle, without sending the sub-commands to the slave processors in the read sequence S900 or the write sequence S1000.

If the process target data of the command is judged as not containing the D field 713 in S1125 (S1125: NO), the processing advances to S1141. Here, for the process target data of the command not containing the D field 713, "no distribution" is set as the return value of the executor determination processing 5913. This is because, when the data contains only two data fields (the C field 711 and the K field 712) (not containing the D field 713), the processing load of the main processor 12 is small, so that the process distribution cannot be expected to produce much effect.

In S1131, the master processor performs processing of selecting a slave processor in charge of the process (hereinafter referred to as executor selection processing S1131). The executor selection processing S1131 will be described in detail later.

After completion of the executor selection processing S1131, the master processor sets the return value to a result of the executor selection processing S1131 (S1132). Then, the processing returns to the read sequence S900 or the write sequence S1000.

<Executor Selection Processing S1131>

Figure 12:
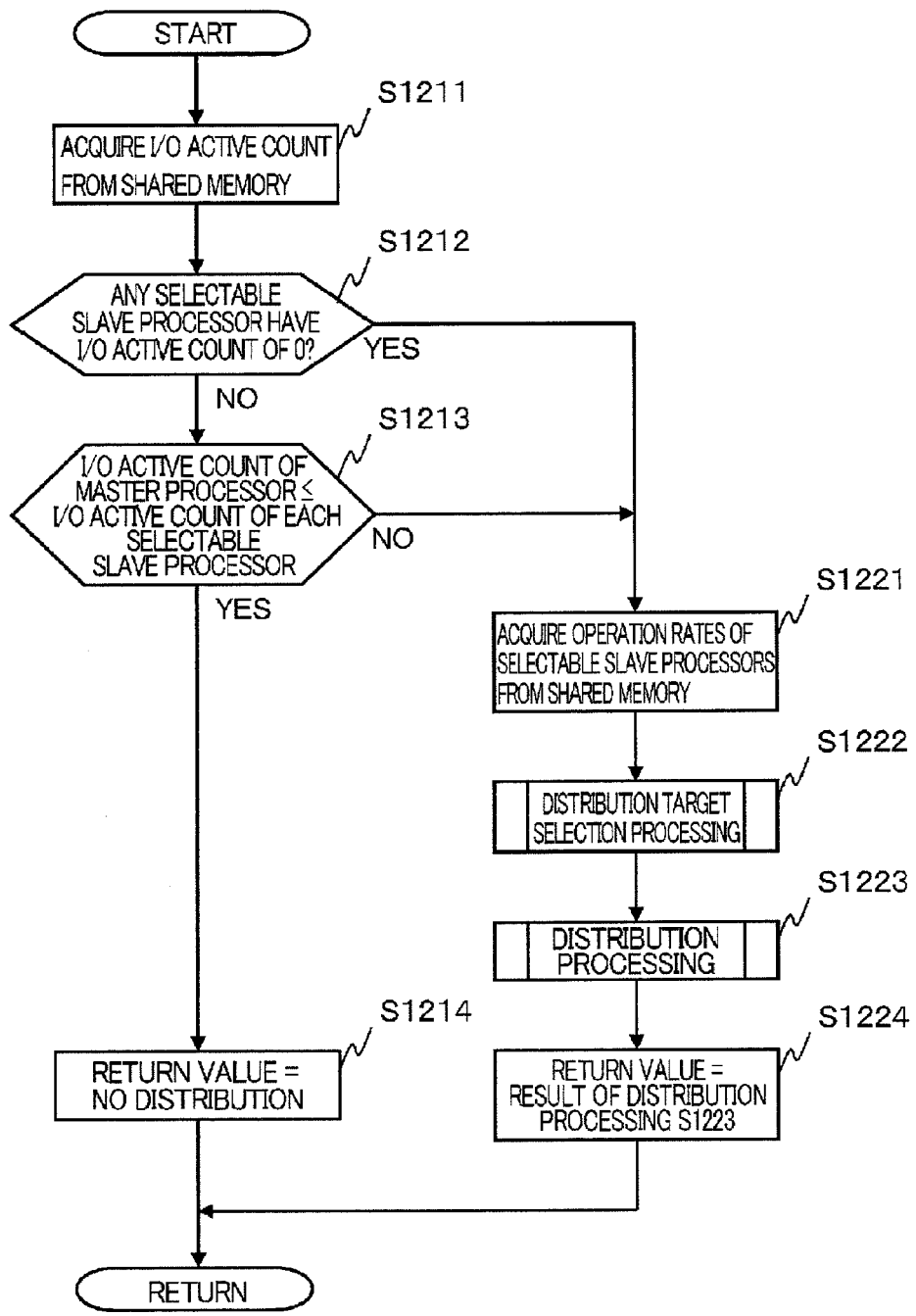
FIG. 12 is a flowchart for explaining executor selection processing S1131.

FIG. 12 is a flowchart for explaining the details of the executor selection processing S1131 in FIG. 11. The executor selection processing S1131 will be described below with reference to FIG. 12.

From the operation information stored in the shared memory 15, the master processor firstly acquires the I/O active count of each of slave processors that can be selected as a process allocation target (hereinafter referred to as a selectable slave processor) (S1211). Here, information indicating a relationship between a master processor and slave processors available to the master processor is stored and managed in the shared memory 15, for example. The master processor accesses the shared memory 15 when needed, and acquires information on which main processor 12 is a selectable slave processor.

FIG. 13 illustrates an example of the operation information. In operation information 1300, an operation rate (%) 1312 and an I/O active count (load indicator) 1313 are managed in association with an identifier 1311 (main processor ID) of each main processor 12.

Returning to FIG. 12, the master processor judges whether or not there is a selectable slave processor having an I/O active count of "0" (i.e., a processor currently not running any process) among the selectable slave processors (S1212). If there is a selectable slave processor having an I/O active count of "0" (S1212:YES), the processing advances to S1221. Instead, if there is no selectable slave processor having an I/O active count of "0" (S1212: NO), the processing advances to S1213.

In S1221, the master processor acquires the latest operation rate of each of the selectable slave processors from the shared memory 15 (S1221). Then, the master processor performs distribution target selection processing S1222 and distribution processing S1223 by using the acquired operation rates, and sets a result of the distribution processing S1223 as the return value of the executor selection processing S1131 (S1224). Thereafter, the executor selection processing S1131 is terminated. The distribution target selection processing S1222 and the distribution processing S1223 will be described in details later.

On the other hand, in S1213, the master processor compares its own I/O active count with the I/O active count of each of the selectable slave processors. If its own I/O active count is larger than the I/O active counts of all the selectable slave processors (S1213: NO), the processing advances to S1221.

If its own I/O active count is equal to or smaller than the I/O active count of any of the selectable slave processors as a result of the comparison (S1213: YES), the master processor sets "no distribution" as the return value (S1214). Then, the executor selection processing S1131 is terminated.

In this way, "no distribution" is set as the return value when the I/O active count of the master processor is equal to or smaller than the I/O active count of any of the selectable slave processors as a result of the comparison (in other words, set so that only the master processor performs the processing for the command). This is because, if the master processor currently under a low processing load itself performs the I/O process, the performance improvement of the storage apparatus 10 can be expected with appropriate load balancing.

<Distribution Target Selection Processing S1222>

Figure 14:
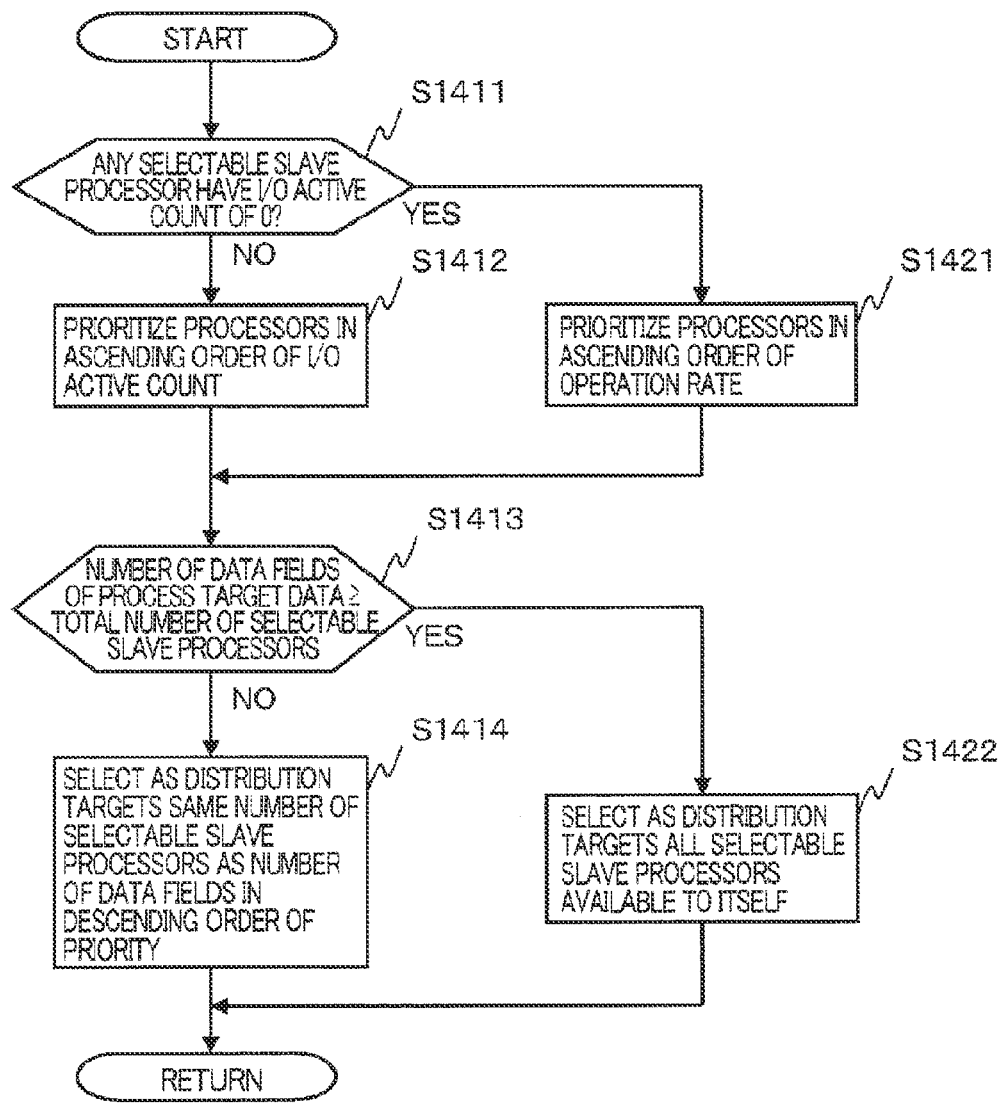
FIG. 14 is a flowchart for explaining distribution target selection processing S1222.

FIG. 14 is a flowchart for explaining the details of the distribution target selection processing S1222 in FIG. 12.

Firstly, the master processor judges whether or not there is a slave processor having an I/O active count of "0" (S1411). In the case where there is a slave processor having an I/O active count of "0," the entire selectable slave processors are understood to operate under a low load.

If there is a slave processor having an I/O active count of "0" among the selectable slave processors (S1411: YES), the master processor prioritizes the selectable slave processors in ascending order of the operation rate (S1421). Since the master processor prioritizes the selectable slave processors in ascending order of the operation rate in this way, the master processor can allocate I/O processes to the slave processors having low operation rates preferentially, which in turn leads to appropriate load balancing among the main processors 12.

On the other hand, if there is no slave processor having an I/O active count of "0" (S1411: NO), the master processor prioritizes the selectable slave processors in ascending order of the I/O active count (S1412). Thereafter, the processing advances to S1413. Since the master processor prioritizes the selectable slave processors in ascending order of the I/O active count in this way, the master processor can allocate I/O processes to slave processors currently under a low processing load preferentially, which in turn leads to appropriate load balancing among the main processors 12.

In S1413, the master processor compares the number of data fields of the process target data of the command (the total number of data fields acquired in S1121 or S1126 in FIG. 11) with the total number of selectable slave processors.

If the total number of data fields of the process target data of the command is equal to or larger than the total number of selectable slave processors as a result of the comparison (S1413: YES), the master processor selects all the selectable slave processors available to the master processor as distribution targets (S1422). Then, the distribution target selection processing S1222 is terminated.

On the other hand, if the total number of data fields of the process target data of the command is smaller than the total number of selectable slave processors as a result of the comparison (S1413: NO), the master processor selects, as distribution targets, the same number of selectable slave processors as that of data fields of process target data in descending order of the priority (S1414). Then, the distribution target selection processing S1222 is terminated.

<Distribution Processing S1223>

Figure 15:
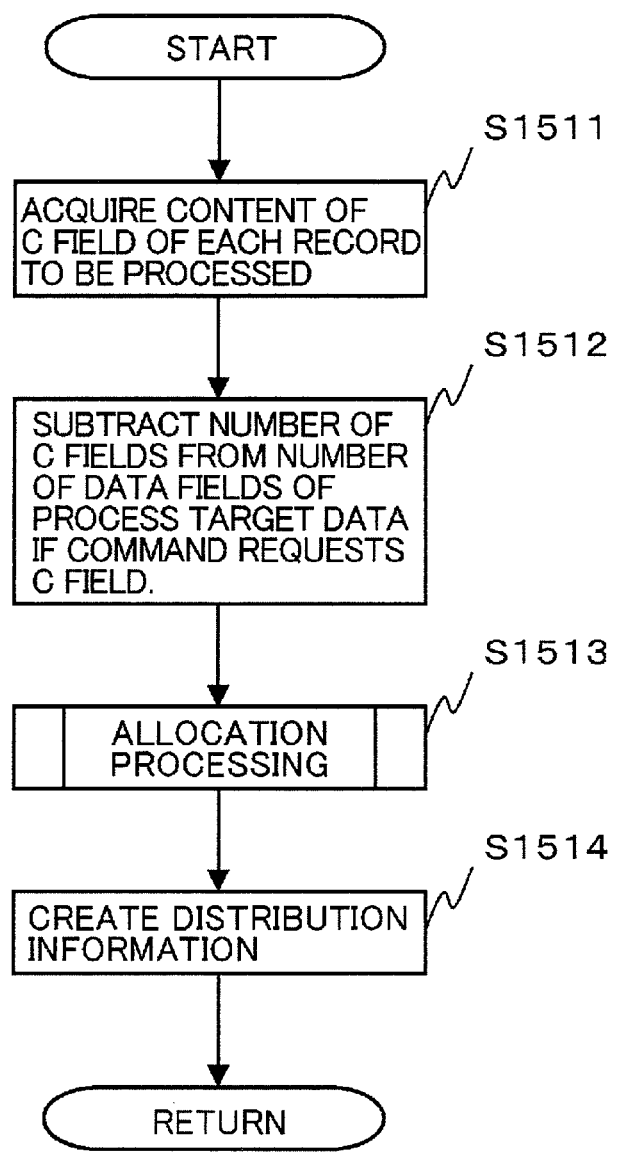
FIG. 15 is a flowchart for explaining distribution processing S1223.

FIG. 15 is a flowchart for explaining the details of the distribution processing S1223 in FIG. 12.

Firstly, the master processor acquires the content of the C field of each record of the process target data of the command (the cylinder number/head number/record number (CCHHR), the data length (KL) of the K field 712, and the data length (DL) of the D field 713) (S1511).

Subsequently, if the command is a command to request a transfer of data in the C field 711 to the host apparatus 3, the master processor subtracts the number of the C fields 711 from the total number of data fields of the process target data (the number of data fields acquired in S1211 or S1126 in FIG. 11) (S1512). In this way, if the command is a command to request a transfer of data in the C field 711 to the host apparatus 3, the number of C fields 711 is subtracted from the total number of data fields of the process target data for the following reason. Specifically, even when the processes for the C fields 711 are allocated to the slave processors, the master processor always needs to read the data from the C fields 711 (needs the information in the C fields 711 to generate subcommands to the slave processors). Hence, it is not preferable to distribute the processes for the C fields 711 to other processors (the effect of load balancing is low even though the processes are distributed to the slave processors).

Thereafter, the master processor performs processing of determining which slave processor will take charge of the process for each data field (hereinafter referred to as allocation processing S1513). The allocation processing S1513 will be described in details later.

Upon completion of the allocation processing S1513, the master processor generates the distribution information on the basis of a return value of the allocation processing S1513 (an allocation ratio of data fields to be allocated to the selectable slave processors). Then, the distribution processing S1223 is terminated.

<Allocation Ratio Determination Processing S1513>

Figure 16:
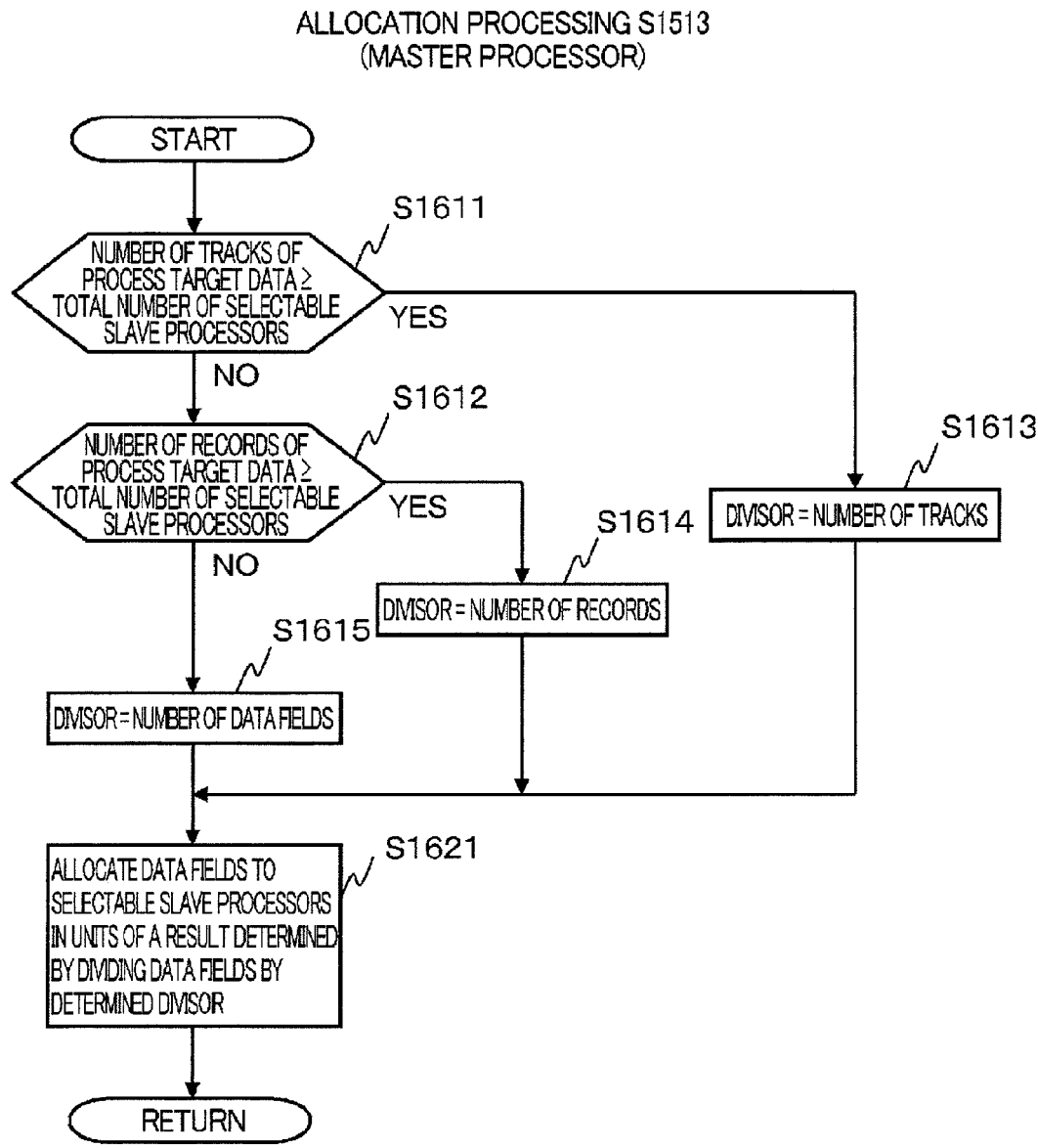
FIG. 16 is a flowchart for explaining allocation processing S1513.

FIG. 16 is a flowchart for explaining the details of the allocation processing S1513 in the distribution processing S1223 in FIG. 15.

Firstly, the master processor compares the number of tracks of the process target data of the command and the total number of selectable slave processors (S1611).

If the number of tracks of the process target data of the command is equal to or larger than the total number of selectable slave processors as a result of the comparison (S1611: YES), the master processor determines that an allocation unit of data fields of the process target data is a result obtained by dividing the total number of data fields of the process target data of the command by the number of tracks to be processed (in other words, divides the total number of data fields to be processed by the number of tracks, and allocates the I/O processes for data fields in units of the resulting number to the selectable slave processors) (S1613). Thereafter, the processing advances to S1621.

On the other hand, if the number of tracks of the process target data of the command is smaller than the total number of selectable slave processors as a result of the comparison (S1611: NO), then the master processor compares the number of records of the process target data of the command with the total number of selectable slave processors (S1612).

If the number of records of the process target data of the command is equal to or larger than the total number of selectable slave processors as a result of the comparison (S1612: YES), the master processor determines that the allocation unit of data fields of the process target data is a result obtained by dividing the total number of data fields of the process target data of the command by the number of records to be processed (in other words, divides the total number of data fields to be processed by the number of records to be processed, and allocates the I/O processes for data fields in units of the resulting number to the selectable slave processors) (S1614). Thereafter, the processing advances to S1621.

Instead, if the number of records of the process target data of the command is smaller than the total number of selectable slave processors as a result of the comparison (S1612: NO), the master processor determines that the distribution unit of data fields of the process target data is each of data fields to be processed (that is, allocates the I/O processes for data fields on a data-field by data-field basis to the selectable slave processors (S1615). Thereafter, the processing advances to S1621.

Here, a specific example is provided on the assumption that the number of data fields is 42, the number of records is 21, the number of tracks is 2, and the total number of selectable slave processors is 4, for instance. In this case, the number of tracks is smaller than the total number of selectable slave processors (S1611: NO) and the number of records is equal to or greater than the total number of selectable slave processors (S1612: YES) hold true. Hence, the divisor is the number of records, i.e., 21, and the number of data fields, i.e., 42 is divided by 21 to obtain a result of 2. As a result, the I/O processes for the data fields are allocated to the selectable slave processors in units of the resulting number (=2) of data fields, i.e., two data fields.

In this way, the master processor allocates the selectable slave processors the I/O processes for data fields to be processed in units of the same number of data fields as a result obtained by using the number of tracks as the divisor if the number of tracks of the process target data is equal to or larger than the total number of selectable slave processors, or a result obtained by using the number of records as the divisor if the number of records of the process target data is equal to or larger than the total number of selectable slave processors. Thus, the master processor can efficiently and appropriately allocate the data fields to the selectable slave processors depending on the number of pieces of the process target data.

In S1621, the master processor allocates the data fields to the selectable slave processors in units of a result obtained by the divisor determined in the processing in S1611 to S1615, by determining how many units are to be allocated to the selectable processors on the basis of their respective operation rates. Then, the allocation ratio determination processing S1513 is terminated.

Here, a specific example is provided on the assumption that the total number of selectable slave processors is 4 (hereinafter also referred to as selectable slave processors #1 to #4 in a distinguishable manner), and the operation rates of the slave processors #1 to #4 are 5%, 15%, 10%, and 10%, respectively. In this case, the master processor allocates the selectable slave processors #1 to #4 the I/O processes for the data fields in inverse ratio (6:2:3:3) to the ratio of the operation rates.

Thus, since the master processor allocates more data fields to a slave processor having a lower operation rate as described above, the master processor can equalize the loads on the respective slave processors and achieve appropriate load balancing.

<Distribution Information>

In the read sequence S900 in FIG. 9, the master processor notifies the communication control processor 11 of the distribution information (S914) after the completion of the executor determination processing S913. This distribution information is generated by the master processor on the basis of the return value of the executor determination processing S913, and is notified to the communication control processor 11 by the master processor. Then, the communication control processor 11 organizes read data for the read command on the basis of the allocation information notified by the master processor, and transmits the organized read data to the host apparatus 3 when needed.

FIG. 17 illustrates an example of the distribution information. Distribution information 1700 is generated for each main processor 12 that takes charge of a process for read data.

A read portion 1711 has set information indicating which one of record or track is handled by the distribution information 1700. In FIG. 17, the allocation information 1700 is generated for a record.

A read number 1712 has set information indicating how many records or tracks are handled by the information managed in the distribution information 1700. In FIG. 17, the allocation information 1700 is for two records.

A CCW number 1713 has set information indicating which CCW 410 is handled by the information managed in the allocation information 1700 (hereinafter such information is referred to as a CCW number). In FIG. 17, the distribution information 1700 is for a CCW 410 having a CCW number "x0300."

A sequence number 1714 has set an identifier assigned to each of sequences generated to process the command in the CCW 410 set in the CCW number 1713 (hereinafter such identifier is referred to as a sequence number). In FIG. 17, the distribution information 1700 is for a sequence with a sequence number "1."

A storage destination address 1715 has set information (address) indicating a location in the data storage buffer 14 where the read data read from the storage drive 171 by the sequence set in the sequence number 1714 is to be stored. In FIG. 17, the data read from the storage drive 171 by the sequence is stored at an address "x48000000" in the data storage buffer 14.

A C field information 1716 has stored the information in the C fields 711 of the records to be processed based on the distribution information 1700. In FIG. 17, the distribution information 1700 is for two records, and the C field information 1716 has set the information in the C field 711 of each of the two records.

<Processing by Communication Control Processor for Read Command Process>

As illustrated in FIG. 9, after storing the read data into the data storage buffer 14, the slave processor directly notifies the communication control processor 11 of the completion of the storage (read data storage notification) (S918, S919).

On the basis of the allocation information 1700 received in S914, the communication control processor 11 monitors in real time the storage state in the data storage buffer 14 for the read data to be returned as a response to the read command to the host apparatus 3. The communication control processor 11 transfers the read data stored in the data storage buffer 14 to the host apparatus 3 sequentially on the basis of the foregoing read data storage notifications.

FIG. 18 is a flowchart for explaining processing performed by the communication control processor 11 for the above transfer of the read data to the host apparatus 3 (hereinafter referred to as read data transfer processing S1800).

Upon receipt of the read data storage notification sent from the slave processor (S1811: YES), the communication control processor 11 searches for an entry matched with the CCW number included in the read data storage notification (S1812).

Figure 19:
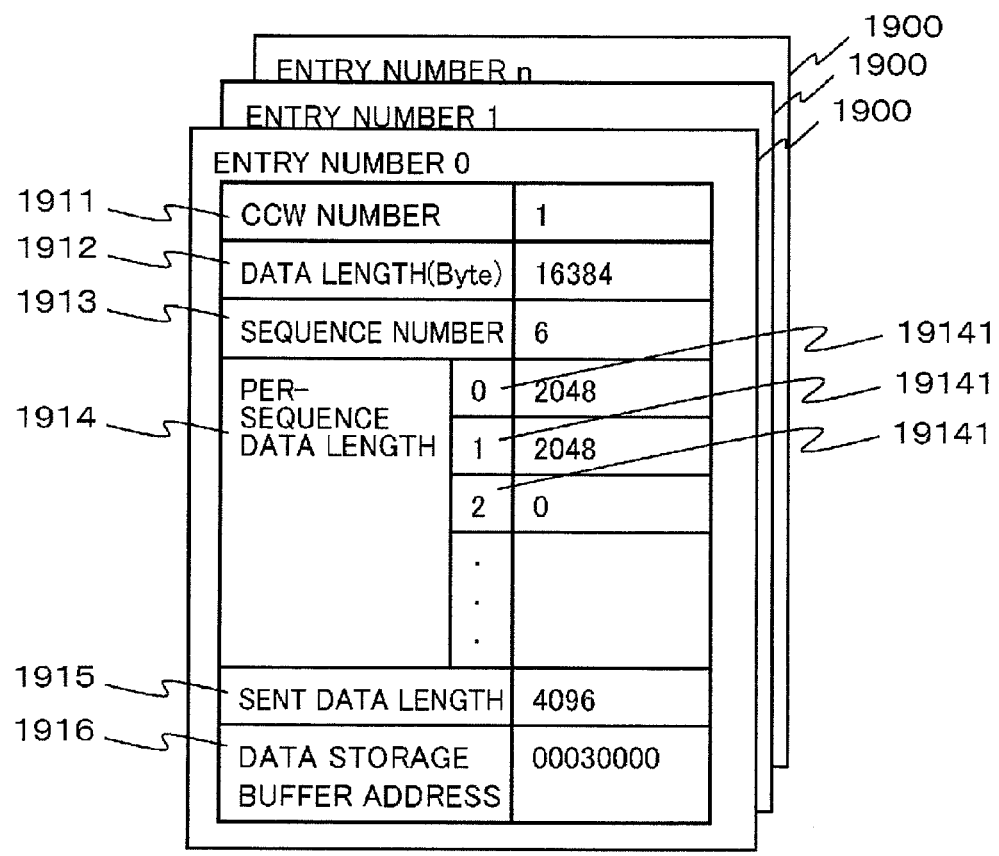
FIG. 19 is a diagram illustrating an example of an entry 1900.

FIG. 19 illustrates an example of the entry managed by the communication control processor 11. Here, an entry 1900 is stored, for example, in the memory 112 of the communication control processor 11, the shared memory 15, or the like. The communication control processor 11 generates the entry 1900 for each CCW number on the basis of the distribution information 1700.

In FIG. 19, a CCW number 1911 has set a CCW number. A data length 1912 has set the total data length of read data specified in the CCW.

A sequence number 1913 has set the total number of sequences described above (sequences generated to process the command in the CCW 410).

A per-sequence data length 1914 has set a storage state of read data in the data storage buffer 14 for each sequence (each sequence is identified by a sequence number 19141) (i.e., indicates a data length of the read data already stored in the data storage buffer 14).

A sent data length 1915 has set a transmission state of the read data specified in the CCW 410 to the host apparatus 3 (the total data length of the read data already sent to the host apparatus 3). A data storage buffer address 1916 has set an address of the data storage buffer 14 allocated to the CCW 410 (the address at which the read data of the CCW 410 is stored).

Returning to FIG. 18, the communication control processor 11 searches out the matched entry 1900, and updates the per-sequence data length 1914 (S1813) on the basis of the data length of the read data already stored in the data storage buffer 14 for each sequence number, the data length contained in the read data storage notification.

Subsequently, the communication control processor 11 judges whether or not the data length of read data unsent to the host apparatus 3 in the read data already stored in the data storage buffer 14 is longer than the unit for transferring read data to the host apparatus 3 (hereinafter referred to as a transfer length) (S1814).

Note that the communication control processor 11 obtains the data length of read data unsent to the host apparatus 3 in the read data already stored in the data storage buffer 14, by subtracting the sent data length 1915 from the total sum of the data lengths of data already stored for the sequences in per-sequence data length 1914 in the entry 1900.

If the data length of unsent read data is longer than the transfer length as a result of the judgment (S1814: YES), the communication control processor 11 sends the host apparatus 3 the unsent read data stored in the data storage buffer 14 of a transfer length (or an integral multiple of the transfer length) (S1815). Then, the communication control processor 11 adds the data length of the data transferred in S1815 to the sent data length 1915 of the entry 1900 (S1816). Then, the processing returns to S1811.

On the other hand, if the data length of unsent read data is not longer than the transfer length as a result of the judgment (S1814: NO), the communication control processor 11 judges whether or not the read data for all the sequences of the entry 1900 has been received (S1821). If the read data for all the sequences of the entry 1900 has not been received yet (S1821: NO), the processing returns to S1811.

Instead, if the read data for all the sequences of the entry 1900 has been already received (S1821: YES), the processing advances to S1822, and the communication control processor 11 sends the remaining unsent read data to the host apparatus 3 (S1822). Thereafter, the read data transfer processing S1800 for the entry 1900 is terminated.

As described above, the storage apparatus 10 causes the slave processors to share processes in the units of data fields (the C field, the K field, and the D field), which form a single record in CKD format, and thereby achieves load balancing of I/O processes in finer units than in a conventional method. In addition, the distribution of I/O processes in the units of data fields can produce load balancing effects even when an I/O request for only one record is received. In the case where a large number of I/O requests each targeting for only one record are sent from the host apparatuses 3, in particular, the distribution in the foregoing way can make the load balancing function effectively.

Moreover, this enables the load balancing among core processors (main processors 12) in a multi-core processor, and thus brings the benefit from the use of the multi-core processor.

Although the preferred embodiments of the present invention have been heretofore described, these embodiments are only for illustrative purposes and are not intended to limit the scope of the present invention to the embodiments. The present invention can be implemented as various other embodiments.

The invention claimed is:

1. A storage apparatus, comprising:
 a communication control processor, configured to control communications with an external apparatus; and
 a plurality of main processors, each main processor configured to perform an input/output (I/O) process on a storage drive according to an I/O request received from the external apparatus,
 wherein the storage apparatus:
  manages data to be stored or data that has been stored in the storage drive in accordance with a Count Key Data (CKD) format, which includes a count (C) field, a key (K) field, and a data (D) field;
  distributes the I/O process to a plurality of the main processors in units of data fields on a basis of operation rates of the respective main processors, wherein the operation rate of a main processor is a percentage of a given period of time that the main processor was operating, information of the fields forming a record of data targeted by the I/O process, and an I/O load indicator, which is a load indicator of the I/O process currently running on each of the main processors; and
  does not distribute the I/O process to the plurality of main processors when the I/O load indicators of all the main processors other than the main processor receiving the I/O request are not zero, and when the I/O load indicator of the main processor receiving the I/O request is equal to or less than the I/O load indicators of all the other main processors.

2. The storage apparatus according to claim 1, wherein the storage apparatus sets a destination of the I/O process distribution preferentially in ascending order of the operation rate or the I/O load indicator of the main processor.

3. The storage apparatus according to claim 1, wherein the storage apparatus does not distribute the I/O process to the plurality of main processors for a record not including a D field.

4. The storage apparatus according to claim 1, wherein when the I/O request is a request to read a C field, the storage apparatus does not distribute the I/O process to the plurality of main processors for the C field to be read.

5. The storage apparatus according to claim 1, wherein the storage apparatus:
 obtains a total number of the data fields to be processed for the I/O process subjected to the distribution,
 obtains a number of records and a number of tracks, wherein the number of tracks is a set of a given number of records,
 distributes the I/O process for the data fields in units having a same number of data fields, wherein the number of data fields in a unit is obtained by dividing a total number of the data fields in the I/O process by the number of tracks in the I/O process, when the number of tracks in the I/O process is equal to or larger than the total number of the main processors available for distribution of the I/O process,
 distributes the I/O process for the data fields in units having the same number of data fields, wherein the number of data fields in a unit is obtained by dividing the total number of data fields in the I/O process by a number of the records in the I/O process when the number of tracks in the I/O process is smaller than a total number of the main processors available for distribution of the I/O process and when the number of records is equal to or larger than the total number of the main processors available for the distribution of the I/O process, and
 distributes the I/O process for the data fields in units of each data field when the number of records in the I/O process is smaller than the total number of the main processors available for the allocation of the I/O process.

6. The storage apparatus according to claim 1, wherein when receiving the I/O request, the communication control processor notifies a content of the I/O request to a master processor that is one of the main processors, and the master processor distributes the I/O process to a plurality of slave processors that are other ones of the main processors.

7. The storage apparatus according to claim 6, further comprising:
 a data storage buffer configured to store therein read data to be read from the storage drive and sent to the external apparatus,
 wherein the slave processor, after storing the read data in the data storage buffer in response to the I/O process distributed by the master processor, directly sends the communication control processor a notification that the read data is stored, and the communication control processor transfers the read data to the external apparatus in response to the notification.

8. The storage apparatus according to claim 1, wherein each of the main processors is one core configuring a multi-core processor.

9. A method of controlling a storage apparatus including a communication control processor configured to control communications with an external apparatus, and
- a plurality of main processors, each main processor configured to perform an input/output (I/O) process on a storage drive according to an I/O request received from the external apparatus,
- the storage apparatus being configured to manage data to be stored or data that has been stored in the storage drive in accordance with a Count Key Data (CKD) format, which includes a count (C) field, a key (K) field, and a data (D) field, the method comprising:
  - distributing the I/O process to a plurality of the main processors by the storage apparatus in units of data fields on a basis of operation rates of the respective main processors, wherein the operation rate of a main processor is a percentage of a given period of time that the main processor was operating, and information of the fields forming a record of data targeted by the I/O process; and
  - not distributing the I/O process to the plurality of main processors for a record not including a D field.

10. The method of controlling a storage apparatus according to claim 9, wherein the distributing is further based on an I/O load indicator, which is a load indicator of the I/O process currently running on each of the main processors.

11. The method of controlling a storage apparatus according to claim 9, wherein when the I/O request is a request to read a C field, the storage apparatus does not distribute the I/O process to the plurality of main processors for the C field to be read.

12. The method of controlling a storage apparatus according to claim 9, wherein when receiving the I/O request, the method further comprising:
- the communication control processor notifying a content of the I/O request to a master processor that is one of the main processors,
- the master processor distributing the I/O process to a plurality of slave processors that are other ones of the main processors,
- storing read data to be read from the storage device in a data storage buffer of the storage apparatus by the slave processor in response to the I/O process distributed to the slave processor by the master processor,
- directly sending a notification from the slave processor to the communication control processor that the read data is stored, and
- the communication control processor transferring the read data to the external apparatus in response to the notification.

* * * * *